June 15, 1926. 1,588,901
O. E. MERRELL
MIXER
Filed Jan. 3, 1925 3 Sheets-Sheet 3

Patented June 15, 1926.

1,588,901

UNITED STATES PATENT OFFICE.

OLIVER EDWARD MERRELL, OF SYRACUSE, NEW YORK, ASSIGNOR TO MERRELL-SOULE COMPANY, OF SYRACUSE, NEW YORK, A CORPORATION OF NEW YORK.

MIXER.

Application filed January 3, 1925. Serial No. 361.

This invention relates to a new mixer, and more especially to a mixer designed for dissolving or re-liquefying powdered milk in water with or without added material, such as sugar, salt, malt, shortening, etc. used in making a dough batch.

In order to dissolve large quantities of milk powder in water, either a very long time, or else very violent action is necessary in order to break up the lumps of powder, and to bring all the particles of the milk into actual contact with the water.

Heretofore attempts have been made to dissolve large quantities of milk powder in water by the use of a single beater in a large tank, and trouble has been commonly experienced from the fact that certain parts of the tank were so far from the beater that they were not subject to violent beating action. In many cases, the contents of the tank at a distance from the beater was so little influenced by the action of the beater that lumps of milk powder would remain in these distant parts, and considerable time would elapse before they would be drawn into the beater and broken up.

Further, in order to emulsify shortening or fat with any liquid containing an emulsifying agent, such as milk, difficulty arises from the fact that the shortening tends to remain on the surface of the liquid, and it is only with difficulty that it is all brought within the sphere of action of a beater located near the bottom of the tank. Violent action is essential in order to break up the fat and secure a suspension of the fat globules through the liquid, thereby producing a partial emulsion.

The mixer of this invention is especially adapted to handling these difficulties for the reason that all of the material to be mixed is necessarily and repeatedly drawn through the beater, and thereby subjected to the violent action essential to effect the desired result, and no difficulty is experienced from fat floating on the surface, and thereby failing to be acted on by the beater.

Other advantages of this invention reside in the details of the structure of the mixer all as will more fully appear from the following description taken in connection with the accompanying drawings, in which:—

Figure 1:
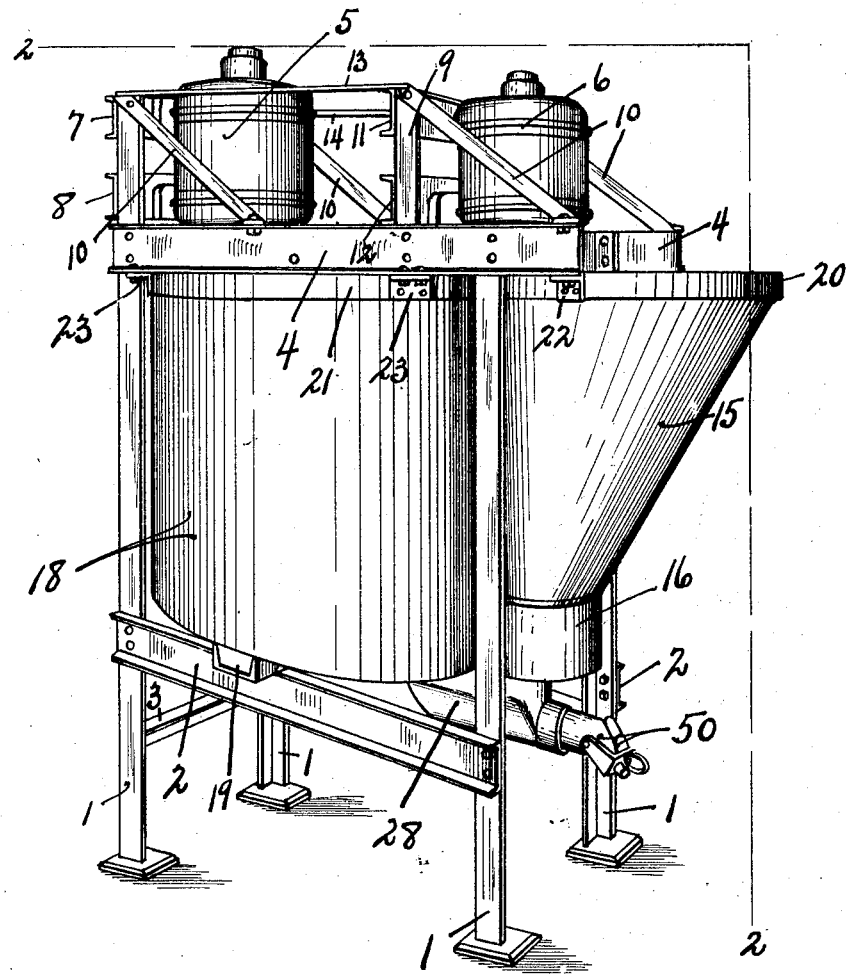
Figure 2:
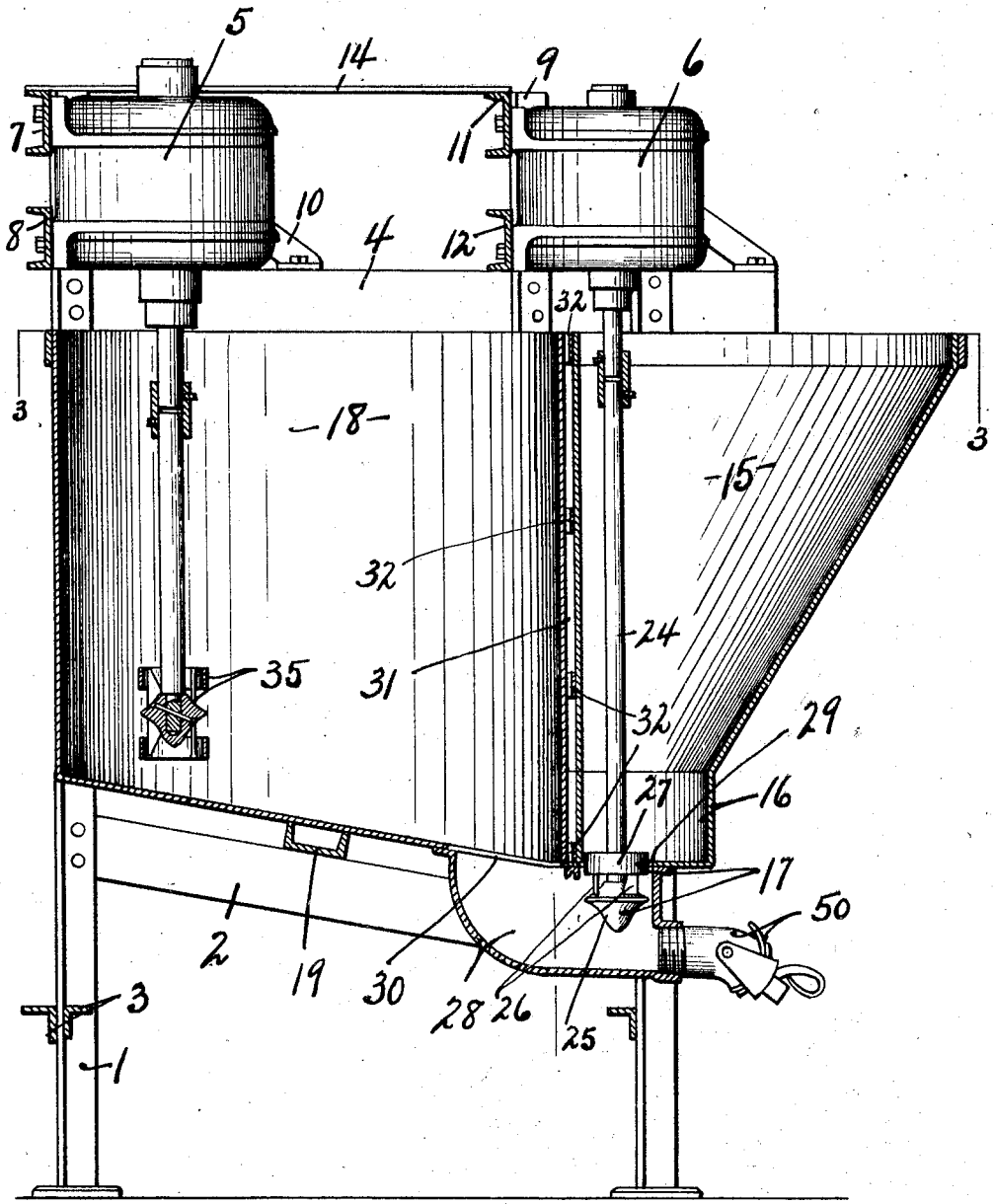
Figure 3:
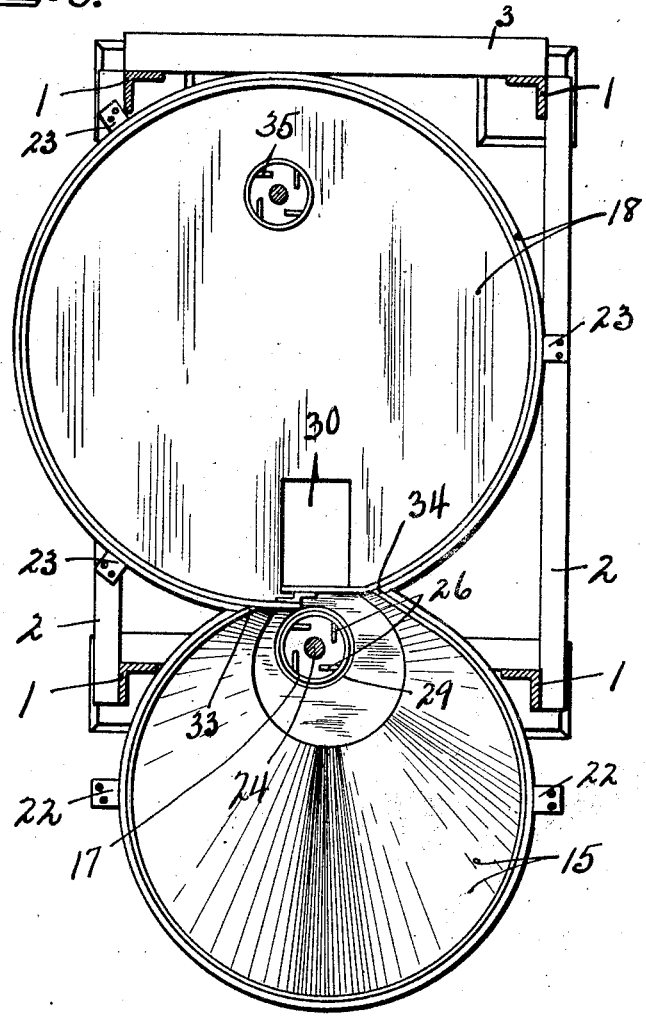

Figure 1 is a perspective view of the mixer.
Figure 2 is a section on line 2—2, Figure 1.
Figure 3 is a section on line 3—3, Figure 2.

The apparatus, as shown, is in the nature of a two-tank structure supported upon any suitable framework, as for instance, that illustrated, which comprises in this instance four (4) uprights —1— constituting corner posts of the structure, these uprights being connected near the bottom by longitudinal side rails —2—, and an end rail —3—. The structure is open at one end, the adjacent posts being unconnected by end rails. Upper side rails —4— are provided for connecting the posts near their upper ends. For the purpose of carrying the driving motors —5— and —6—, a super-structure is provided above the side-rails —4—. The two rear posts —1— extend above the side-rails —4— as indicated, and are connected by end rails —7— and —8— and intermediate the length of the side rails —4— the posts —9— are positioned, secured to the side rails and projecting upwardly a distance substantially equal to the extension of the rear posts —1— above the side rails, and this super-structure is braced by means of the braces —10— connected to the side-rails and to the super-structure.

The posts —9— are connected by end or cross-rails —11— and —12— to which the motor —6— is secured, and the motor —5— is secured to the end rails —7— and —8—. The upper ends of the posts —9— may be connected to the respective upward extensions of the rear posts —1— by longitudinal bars —13— and —14— respectively. The structure so far described is one here provided for supporting a two-tank structure about to be described, and the driving motors —5— and —6—.

The apparatus further consists of a primary tank or hopper —15— which tapers downwardly, and is of somewhat frusto-conical form, terminating at its lower end in a substantially cylindrical portion —16— having an opening in its bottom of a size adapted to receive the beater or agitator —17—.

The secondary tank —18— is as illustrated considerably larger than the tank 15 and may be of substantially cylindrical form with its bottom wall inclined downwardly and forwardly, and resting upon a cross-bar —19— supported substantially centrally of the side rails —2—.

These side rails and the cross-bar, as well as the upper side rails —4— are formed of channel bars, and are of substantially U-shaped form in cross-section, while the corner posts —1— are, as illustrated, formed of angle bars, and the side rails —2— are secured to their respective posts in a manner to incline downwardly and forwardly to conform substantially with the inclination of the bottom wall of the secondary tank —18—.

Preferably both the tank —15— and the tank —18— are reinforced at their upper ends, as by bands —20— and —21— respectively, and the angle clips —22— may be secured to the tank —15— and band —20— for attachment to the side rails —4— as by riveting, bolting, or other suitable well known means, and in like manner the tank —18— is equipped with angle clips —23— secured to the tank and the band —21— in any suitable manner, for attachment to the side rails —4— to firmly support the tank in position upon the framework.

The agitator —17— is mounted upon the shaft —24— which may be the armature shaft or an extension of the armature shaft of the motor —6—, and the agitator here shown is peculiarly adapted for installation in the apparatus of this invention in that its intake is vertical and axial, while its discharge is lateral and radial. In structure, the beater —17— is the upper half of the beater described and claimed in U. S. Letters-Patent No. 1,375,406, dated April 19, 1921, and consists of a plate or journal portion —25— for the shaft —24—, having upstanding vanes —26— preferably tapering upwardly, and lying in cords of the circular plate —25— so as to draw the material to be mixed downwardly through the ring —27— spaced from and surrounding the shaft —24—, and secured to the upper ends of the vanes or blades —26—.

The ring —27— is of a diameter slightly less than the opening in the bottom of the primary tank —15—, and substantially fills the opening so that all material passing from the tank —15— must pass down in the ring —27— and is thrown outwardly and laterally by the vanes —26— into the elbow-shaped pipe —28— secured to the bottom walls of the tanks —15— and —18—, and disposed beneath the opening —29— in the tank —15— and the opening —20— in the tank —18— so as to constitute a means of communication between the tanks so that material passing through the beater is forced upwardly into tanks —18—, and for the purpose of effecting a continuous circulation between the tank —15— and the tank —18—, the wall of the tank —18— is split and the adjacent edges overlap and are spaced apart to form a vertical slot or passageway —31— leading from the tank —18—.

This slot may extend throughout all or any portion of the height of the tank —18— and as shown, the over-lapping edges are spaced apart and secured together by spacing members —32—.

This slot leading from the tank —18— opens directly into the primary tank —15— and this arrangement is effected by having the portion of the wall of the tank —18— in which the slot —31— is formed constitute also a portion of the wall of the tank —15—, and as here shown, the wall of tank —15— is incomplete and the opposite vertical edges —33— and —34— of the wall of tank —15— abut against and are secured to the wall of the tank —18— upon opposite sides of the vertical slot —30—. The joint formed between the walls of the two tanks is liquid-tight.

The motor —5— has its armature shaft, or an extension of its armature shaft equipped with a beater —35— of the construction shown in Letters-Patent above referred to, and this beater draws in the material to be mixed axially, both in an upward direction and a downward direction, and throws it out laterally and radially. The beater is disposed eccentrically of the tank —18— so as to avoid a mere continuous symmetrical rotary movement of the fluid around the tank.

In the operation of this structure, the material to be mixed, such as water and milk-powder, with or without added materials, is placed in the primary tank —15—. Preferably, the water is placed in the tank first, and the milk powder and other materials may then be dumped into the tank. Where fat or shortening is used which is solid, at room temperature, it is preferable to heat the water, and then place the fat in the water so that it will thereby be reduced to liquid form.

In view of the fact that the beater —24— draws the material axially, it is essential that all of the material placed in tank 15 should pass downwardly within ring —27— of the beater, through the beater, by which it is then forced upwardly into the bottom of the tank —18— where it is agitated and mixed by the beater —35— and continually returns to the tank —15— through the vertical slot —31— where it is again drawn through the beater —17— and thoroughly mixed, agitated and broken up.

This operation insures repeated subjection of all the material to the forceful action of the beater —17—, and all of the material repeatedly passes through the beater —17— and by it is forced into the tank 18 where additional agitation and forceful mixing is effected by the beater —35—.

Continuous circulation of the mix is assured by reason of the fact that the level of the mix or liquid in tank —15— is always considerably lower than the level of the liquid in tank —18— and this for the reason that the beater is continually drawing the liquid or mix from tank —15— and forcing it into the tank 18, and this difference in level not only insures regular circulation, but as a result of regular circulation, repeated subjection of the mix or liquid to the action of the beater. The pipe —28— may, as shown, be equipped at its forward end with a gate —50— of any usual and well known construction which permits withdrawal of the mix from the apparatus.

Altho I have shown and described a specific construction as illustrative of a perhaps preferred embodiment of my invention, I do not desire to restrict myself to the details of the structure, or to the method of operation, as various changes may be made within the scope of the appended claims.

I claim:

1. In a mixer, a primary tank and a secondary tank having a portion of their walls in common, such common wall having an opening constituting a means of communication between the tanks, additional means of communication between the bottom portions of the tanks, a beater in said additional means of communication, said beater being of a size substantially equal to the cross-sectional area of such additional means of communication, whereby substantially all the material flowing through said additional means of communication must pass through the beater.

2. In a mixer, a primary tank and a secondary tank having a portion of their walls in common, such common wall having an opening constituting a means of communication between the tanks, additional means of communication between the bottom portions of the tanks, a beater in said additional means of communication, said beater being of a size substantially equal to the cross-sectional area of such additional means of communication, whereby substantially all the material flowing through said additional means of communication must pass through the beater and a second beater in said secondary tank.

3. In a mixer, a primary tank and a secondary tank having a portion of their walls in common, such common wall having an opening constituting a means of communication between the tanks, additional means of communication between the bottom portions of the tanks, a beater in said additional means of communication, and a second beater in said secondary tank.

4. In a mixer, a primary tank and a secondary tank, means of communication between the tanks, and a beater having an axial inlet and a radial outlet for maintaining a forced flow of material to be mixed through such means of communication.

5. In a mixer, a primary tank and a secondary tank, means of communication between the tanks, a beater having an axial inlet and a radial outlet for maintaining a forced flow of material to be mixed through such means of communication, and a second beater arranged in and eccentrically of the secondary tank.

6. In a mixer, a primary tank and a secondary tank, means of communication between the tanks, a beater having an axial inlet and a radial outlet for maintaining a forced flow of material to be mixed through such means of communication, a second beater arranged in and eccentrically of the secondary tank, and additional means of communication between the tanks whereby a circulation of the material may be maintained.

7. In a mixer, a downwardly tapered primary tank having an opening in its bottom wall, a secondary tank having a downwardly and forwardly inclined bottom provided with an opening, a conduit connecting said openings, and a beater arranged in the opening in the primary tank, and of a size substantially equal to the size of said opening for maintaining a forced circulation of the material to be mixed.

8. In a mixer, a downwardly tapered primary tank having an opening in its bottom wall, a secondary tank having a downwardly and forwardly inclined bottom provided with an opening, a conduit connecting said openings, and having an axial inlet and a lateral outlet for maintaining a forced circulation through said conduit and additional means of communication between the tanks permitting flow from the secondary tank to the primary tank.

9. A mixing apparatus comprising a hopper for receiving material to be mixed and having an opening at its lower end, a mixing tank arranged adjacent the hopper, means of communication between the lower end of the hopper through said opening and the mixing tank, an agitator in such communication and arranged to draw the materials from the hopper and force them into the mixing tank, and a second agitator in the mixing tank.

10. A mixing apparatus comprising a hopper for receiving material to be mixed and having an opening at its lower end, a mixing tank arranged adjacent the hopper, means of communication between the lower end of the hopper through said opening and the mixing tank, an agitator in such communication and arranged to draw the materials from the hopper and force them into the mixing tank, a second agitator in the mixing tank and arranged within the tank in an eccentric position.

11. A mixing apparatus comprising a hopper for receiving material to be mixed and having an opening at its lower end, a mixing tank arranged adjacent the hopper, means of communication between the lower end of the hopper through said opening and the mixing tank, an agitator in such communication and arranged to draw the materials from the hopper and force them into the mixing tank, a second agitator in the mixing tank and additional means of communication between the hopper and the tank through the side wall of the hopper.

12. A mixing apparatus comprising a hopper for receiving material to be mixed and having an opening at its lower end, a mixing tank arranged adjacent the hopper, means of communication between the lower end of the hopper through said opening and the mixing tank, an agitator in such communication and arranged to draw the materials from the hopper and force them into the mixing tank, a second agitator in the mixing tank and arranged within the tank in an eccentric position, and additional means of communication between the hopper and the tank through the side wall of the hopper.

13. A mixing apparatus comprising a hopper for receiving material to be mixed and having an outlet in its lower portion, a mixing tank adjacent the hopper, means of communication between the opening in the lower portion of the hopper and the lower portion of the said mixing tank, an agitator disposed in such means of communication and through which substantially all of the said materials must pass in moving from the hopper to the tank, a rotary agitator eccentrically positioned in the mixing tank, means for rotating said agitator about a substantially vertical axis, and additional means of communication between the tank and the hopper.

14. A mixing apparatus comprising a hopper for receiving material to be mixed and having an outlet in its lower portion, a mixing tank adjacent the hopper, means of communication between the opening in the lower portion of the hopper and the lower portion of the said mixing tank, an agitator disposed in such means of communication and through which substantially all of the said materials must pass in moving from the hopper to the tank, a rotary agitator eccentrically positioned in the mixing tank, means for rotating said agitator about a substantially vertical axis, and additional means of communication between the tank and the hopper opening tangentially through the wall of the hopper.

In witness whereof I have hereunto set my hand this 30th day of December, 1924.

OLIVER EDWARD MERRELL.